July 1, 1941.　　　　B. AMES　　　　2,247,626
COOKING APPARATUS
Filed Nov. 9, 1938　　　5 Sheets-Sheet 1

Inventor
Butler Ames
by Roberts, Cushman & Woodbury
attys.

July 1, 1941.    B. AMES    2,247,626
COOKING APPARATUS
Filed Nov. 9, 1938    5 Sheets—Sheet 2

July 1, 1941.　　　　B. AMES　　　　2,247,626
COOKING APPARATUS
Filed Nov. 9, 1938　　　5 Sheets-Sheet 3

Inventor
Butler Ames
by Roberts, Cushman & Woodberry
attys.

July 1, 1941.  B. AMES  2,247,626
COOKING APPARATUS
Filed Nov. 9, 1938  5 Sheets-Sheet 4

Inventor
Butler Ames
by Roberts, Cushman & Woodbury
attys.

Patented July 1, 1941

2,247,626

UNITED STATES PATENT OFFICE 2,247,626

COOKING APPARATUS

Butler Ames, Boston, Mass.

Application November 9, 1938, Serial No. 239,613

8 Claims. (Cl. 219—35)

This invention pertains to electrically heated cooking apparatus useful for broiling, baking, roasting, toasting, frying, boiling, and in fact every conceivable kind of cooking, the apparatus being of self-cleaning type and being operative satisfactorily when supplied with direct or alternating current which may be of usual houselighting voltage, the present invention being an improvement upon the apparatus disclosed in my copending application for Letters Patent Serial No. 155,946, filed July 27, 1937.

While my aforesaid application disclosed a highly useful and desirable type of aparatus, it is the general object of the present invention to provide novel features of improvement capable of embodiment in apparatus such as disclosed in my aforesaid application, but providing additional functional advantages.

In accordance with the present invention I provide a very simple form of fume and odor-eliminating means including a light, easily lifted valve device, consisting of thin sheet metal, for instance aluminum foil, cooperative with a complemental part to define a narrow corridor through which the gaseous substances are constrained to move on their way to the exit passage. The valve and the part which define such narrow corridor are normally in contact, and as said part is heated very hot by direct radiation from the heat source, the valve is also highly heated. During cooking, the valve separates from said associated part at intervals, in response to pressure differential at its opposite sides, thus providing the narrow and hot-walled corridor in which the gaseous products are broken down and odors eliminated. Preferably a portion at least of the thin sheet material forming the valve means is flexible so that it fits snugly in contact with its complemental part under normal conditions, thus closing the exit passage. When cleaning the apparatus, the valve device remains closed and so substantially prevents any draft through the apparatus. Thus it is possible to obtain and maintain the high internal temperature requisite for cleaning.

Since it is an important feature of the present apparatus that it operate usefully with a minimum current consumption and to this end that it conserve the heat energy supplied as fully as is practically possible, the present invention provides for so supporting and uniting the several parts of the apparatus as to reduce to a minimum the loss of heat by direct conduction from the interior to the exterior of the device.

As some heat necessarily escapes, partly by conduction and partly in the gaseous substances which emerge through the exit passages, it is proposed, in accordance with the present invention, to provide for the useful employment of such escaping heat, for example for heating water, keeping cooked food warm, warming or drying dishes, etc., and to this end the apparatus may have a top or cover which is so shaped and designed as to provide a suitable support for such articles or containers as are to be heated or warmed. If desired the support may take the form of an open rack mounted upon but not constituting an essential part of the apparatus, per se.

In the apparatus disclosed in the aforesaid application, provision is made by the use of a covered pot or pots for boiling or otherwise cooking articles. At the inception of boiling or steaming some considerable time elapses before the liquid in the pot reaches a cooking temperature—the liquid being heated mainly by conduction through the walls of the pot, and during this interval, and before the upper part of the pot cover becomes filled with vapor, the upper surfaces of the articles being cooked may become too highly heated by direct radiation from the heat source which pass through the cover and which may dry or even brown the articles being cooked. In my aforesaid application it is suggested that a baffle plate be placed in the upper part of the pot cover to avoid this difficulty.

In accordance with the present invention an improved pot cover is provided having hollow walls providing an annular space for the reception of liquid and which acts both as a baffle to cut down direct passage of radiant heat through the pot cover and also as a source of steam which enters down through suitable openings into the upper part of the pot and not only cooks the articles in an atmosphere of hot or even superheated steam, but protects them from the direct impact of energy from the heat source, so that all danger of scorching or undesired browning is avoided.

In the arrangement disclosed in the aforesaid application the pot cover is provided with an opening for the escape of steam, but in the improved construction herein shown the cover has no outlet opening and fits the pot closely enough to prevent the rapid escape of steam, thereby to ensure a vapor pressure within the pot corresponding to an adequate cooking temperature.

Preferably, though not necessarily, the heat source is so designed as optionally to emit heat energy at different rates; for example, the heat source may comprise two independent resistance coils, one or both of which may be supplied with current at will. If two coils be employed, one may, for example, be placed in series with an automatic thermostatic control operative to cut off current from said coil when the temperature within the cooking chamber becomes excessive.

As the portable apparatus herein disclosed is of limited capacity it may be desirable to use several such devices at the same time, but if several of these devices are to be used where the supply of current is limited, for example, if intended to be connected to the usual house-lighting current, precautions must be taken to avoid overloading the circuit. To this end the current supply means (plug or switch) is preferably so designed that current may be supplied selectively to either or simultaneously to both devices for furnishing either of two stages of heat, that is low or medium, but so that current can be supplied to but one of the devices to furnish the highest stage of heat.

The foregoing, together with other and further objects and advantages of the invention, will be set forth in the following more detailed description and in the accompanying drawings in which

Fig. 2 is an end elevation showing the device of Fig. 1 with the cover fully open;

The apparatus forming the present invention has certain general features in common with the apparatus disclosed in the co-pending application.

The illustrated embodiment of the invention is a cooker substantially elliptical in form, although it may be of any desired shape, for example, square or round, and consisting of a base 1 and cover 2. The base 1 comprises an outer shell 3 and inner shell 4 preferably of sheet metal, suitable insulation 6 in the form of a sheet of polished aluminum or other metal having a hole in the center thereof being interposed between the members 3 and 4. When the insulating plate 6 is employed it may be provided with a down-turned peripheral flange which rests upon the shell 3 and may be secured to the shell 4 by studs, bolts, rivets or the like and separated therefrom by spacers 5. In place of the metal plate 6, plates of other material may be employed for insulation or the air space between the shells may be relied upon for that purpose.

At the center of the shell 3 is provided an upstanding annular boss 7, which is open at the top, and which, when the insulating plate 6 is used, serves to support it at the center thereof. The shell 4 is provided at its center with a downwardly extending annular boss 8 surrounded by a ring 8a which is fixed to the underside of the shell 4 and extends through the hole in the plate 6 and boss 7. An opening or passage is thus provided through the entire thickness of the base for purposes to be described hereinbelow.

The shell 3 includes an upstanding peripheral flange 9, a horizontal outwardly extending rim 10, and a downwardly extending flange 11 which stiffens the rim 10 and supplies a pleasing finish to the base.

Figure 7:
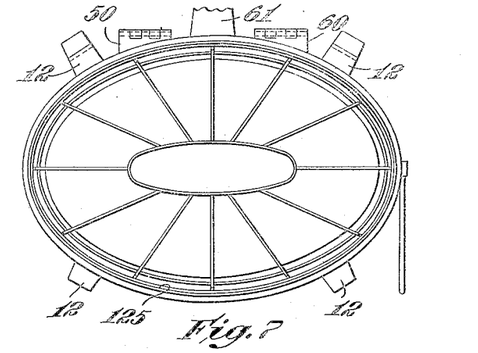
Fig. 7 is a diagrammatic plan view to small scale of the apparatus when provided with a rack upon which food may be kept warm or food, dishes, towels or the like may be dried by the heat energy emitted from the apparatus.

The base is supported upon legs 12, each leg having a foot or pad 13 designed to rest upon a suitable support S, such for example as a table top. Each leg preferably extends upwardly in front of the flange 11 into contact with the under surface of the rim 10 and downwardly in contact with the flange terminating in an ear or tab 15, which underlies the main part of the shell 3 and may be secured thereto by spot welding or rivets. The base is here shown supported by four legs symmetrically disposed (see Fig. 7). The legs 12 at each side of the hinges connecting base and cover are offset at 14 to insure steadiness of the cooker when the cover is raised (see Figs. 2 and 7).

The inner shell 4 has an upstanding rim 16 which preferably terminates in a beaded or otherwise finished edge 17.

The cover, as here illustrated, comprises a substantially vertical side wall and a dome-shaped top. The side wall preferably includes an inner shell 23 and an outer shell 24 of any suitable material. For example, the shell 23 may be of aluminum or some other non-oxidizing metal having a low heat absorptive capacity, while the outer shell 24 may be of common or stainless steel. The space between the shells 23 and 24 is practically closed at the bottom by an annular plate 25 having a downturned flange which fits between the inner surface of the shell 24 and the upturned lower margin of the latter shell. The plate 25 overlies an outwardly projecting flange 26 formed by the upturned and outwardly extending lower edge of the shell 23 and is connected to the latter by screws 22a passing through spacing washers of insulating material. The space between the shells 23 and 24 is closed at the top by an annular plate 27 having an upturned flange which fits between the inner surface of the shell 24 and the inwardly and downwardly turned upper edge of the latter. The plate 27 extends inwardly over the top of the shell 23. A gasket 28 of asbestos or the like is interposed between the upper edge of the shell 23 and the inner downturned edge of the plate 27. The inner portion of the latter plate is of channel shape in cross section, as shown at 29, with its inner edge, as stated, resting upon the gasket 28 while an intermediate portion of the plate 27 bears against the free outer edge of the gasket and deflects the latter downwardly. The top 30 of the inner shell as here illustrated is domed and has a central opening therein.

In addition to the top 30 of the inner shell the top of the cover comprises an intermediate shell 31 and an outer shell 32. The shells 31 and 32 are separated and the space between them is closed by a horizontal flange 33 on the intermediate shell 31, which bears against and may be welded to an annular bead 34 at the edge of a similar horizontal flange 35 on the outer shell 32. The top of the cover is secured to the side wall by a plurality of screws, rivets or the like 36 passed through the flanges 33 and 35 and entering the channel 29 of the plate 27. Spacers 37 held between the flange 33 and the upper edge of the side wall of shell 24 by the screws 36 provide a discontinuous slot 38 extending peripherally around the cover which provides free communication between the outer atmosphere and the space 39 between the shells 30 and 31. The space 40 between the shells 31 and 32 provides air insulation and if desired may contain additional insulation such as polished aluminum foil, rock wool or the like.

Figures 8, 9, 9A:
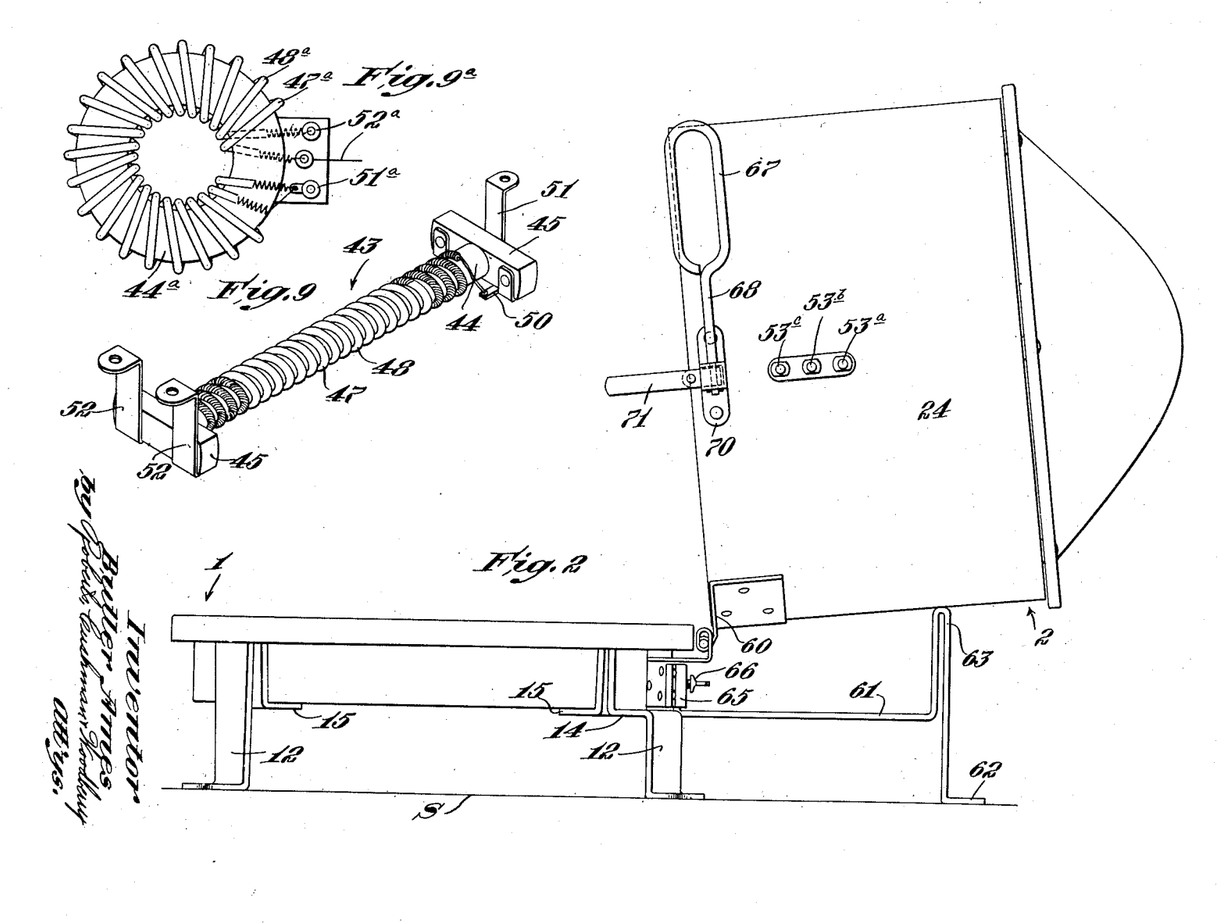
Fig. 8 is a diagrammatic side elevational view to small scale of the upper portion of the apparatus shown in Fig. 7.
Fig. 9 illustrates one form of heating element for such apparatus.
Fig. 9a is a plan view illustrating another form of heating element.
Figure 8:
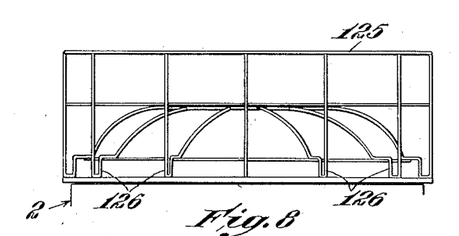

Fixed at the top of the cover below the central opening 42 in the top 30 of the inner shell is a heating element 43. The heating element 43, as shown in Fig. 9, comprises a tubular core 44 of porcelain or other refractory material having bars 45 at each end thereof. On the outer surface of the core are formed two interrelated helical grooves in which are supported coils 47 and 48 laid in the respective grooves. The ends of the coils are welded or otherwise fixedly secured to clips 49 and 50 respectively. The clips at one end of the element are integral with a post 51 and each clip at the other end of the element is integral with a post 52. The heating element is suspended from the top 30 by the straps 51 and 52 which are suitably insulated from the top and are fixed respectively to the end bars 45 of the tubular core. Within the core may be placed a metal rod or tube 46 for a purpose to be set forth below.

In Fig. 9a a modified form of heating element is illustrated wherein in place of the cylindrical tubular core 44 of refractory material above described, there is employed an annular ring 44a of refractory material. This ring is supported by brackets or posts 51a and 52a, corresponding to the posts 51 and 52 above described, and supports two resistance coils 47a and 48a respectively. These coils are connected to the posts 51a and 52a in the same way that the coils 47 and 48 are connected to the posts 51 and 52, all as above described.

Figure 1:
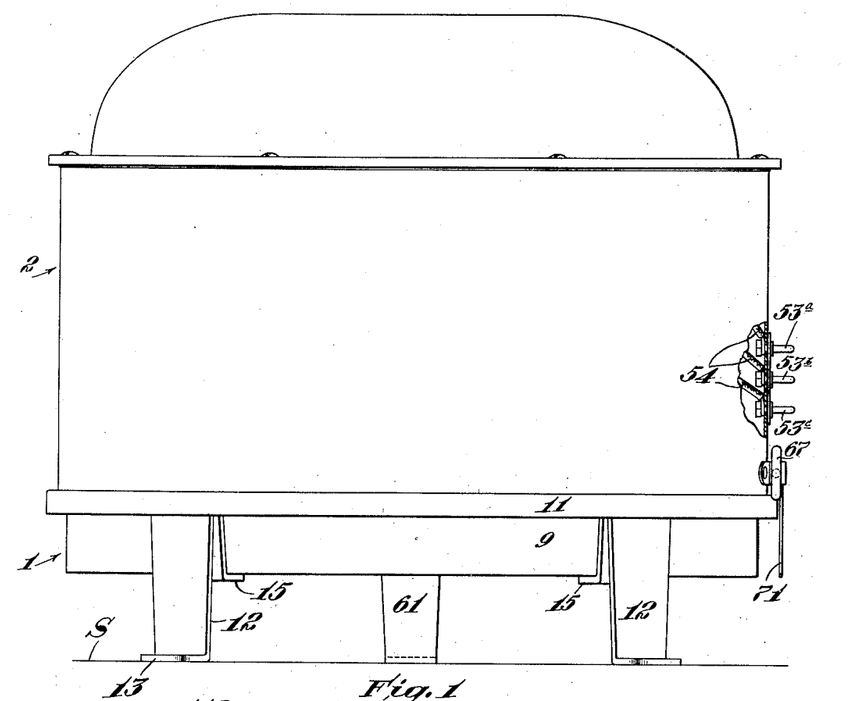
Fig. 1 is a side elevation of one embodiment of the invention.

Mounted upon the cover 2 are prongs 53 (Fig. 1) which are electrically connected to the posts 51 and 52 by conductor 54. For convenience in description it is assumed that the prong 53a is connected to the post 52 integral with the clip 49 of the coil 47; that the prong 53b is connected to the post 51 integral with the clips 50 of both coils 47 and 48; and that the prong 53c is connected to the post 52 integral with the clip 49 of the coil 48. Obviously by suitably connecting the prongs to a source of electrical current either or both coils will be energized to wit; if connected by the prongs 53a and 53b the coil 47 will produce a low heat; if connected by the prongs 53b and 53c the coil 48 will produce a medium heat; and if connected by all three prongs both coils will produce a high heat. Obviously provision for further variations of heat may be provided.

The specific form of cooker herein shown is primarily designed for use with the ordinary house-lighting current and will operate satisfactorily with a current consumption of from 1000 to 1400 watts. Thus it may be connected to the ordinary service outlet without endangering the insulation usually employed in house wiring circuits so that no special wiring is needed. An automatic cut-out 55 (Fig. 3) mounted within a case 56, secured to the outer shell 24 of the cooker, is preferably connected in series with one of the coils, preferably to the medium heat coil 48; the parts being so designed, for example, that the current may be cut in half when the heat within the cooker reaches a certain temperature.

Mounted in the space 39 between the shells 30 and 31 of the cover top, is an automatic valve device 57 (Fig. 3) whose central and upper portion normally rests upon the upper surface of a support 58 held in spaced relation to the inner shell 30 by means of suitable brackets. The valve 57 preferably consists of a piece of very thin and light sheet material. Preferably the lower or skirt-like portion 57a at least of this valve is flexible so that it tends to conform closely to the contour of the outer surface of the inner member 30 of the cover top on which it normally rests. When the valve 57 is in its normal closed position it substantially cuts off communication between the space 42a immediately beneath the support 58 and the space 39 between the members 30 and 31. As here illustrated the heating element 43 is directly below the opening 42 and thus some of the rays of radiant energy emitted by the element 43 pass upwardly through the opening 42 and impinge directly upon the support 58, and are transmitted by conduction through the latter to the central part of the valve device 57. Moreover, as the inner member 30 of the cover top becomes highly heated by the rays of energy emitted by the heat source 43, and as the skirt portion 57a of the valve normally rests upon the outer surface of the member 30, the skirt portion of the valve is likewise highly heated by its direct contact with the member 30. When this valve is closed, it practically cuts off communication between the interior of the cooker (through the opening 42 and space 42a) and the space 39 which leads to the outlet passage 38, and during the cleansing of the apparatus after cooking, as will hereinafter be more fully described, this valve remains substantially closed and thus prevents any draft through the apparatus. In this way the heat energy is conserved so that a very high temperature may be attained. Likewise at the beginning of the cooking operation the valve 57 remains closed, and it is thus possible to raise the temperature very rapidly within the apparatus when the current is turned on even when the only current available is that supplied by the usual house-lighting circuit. However, during the cooking operation and as gases and vapors are evolved from the material being cooked, the resultant pressure differential at opposite sides of the valve 57 will cause the latter to rise and fall and thus, at intervals, open a narrow corridor between the opposed surfaces of the parts 30 and 57a. This corridor leads from the space 42a to the space 39 and through this corridor vapor or gaseous products of cooking may escape to the exit passage 38. As above stated the members 30 and 57a become very hot and as the vapors and gases on their way to the exit opening 38 must pass along the very narrow hot walled corridor, the complex odor-forming substances are broken down into simpler and odorless compounds before they emerge through the exit passage 38. Since the valve skirt 57a flares downwardly and outwardly and is of constantly increasing diameter toward its outer edge, the peripheral dimensions of this narrow corridor constantly increase, so that the velocity of flow of the gaseous substances decreases as they move toward the exit 38, and ample time is afforded for the odor destroying action to take place.

The cover 2 is preferably connected to the base 1 by leaf hinges 59 and 60 (Fig. 7) so that it can not be wholly separated therefrom. As a support for the cover while open, there may be provided a bracket 61 of sheet metal, having a foot 62 and a U-shaped bend 63 on which the cover directly rests. The bracket 61 is secured to the base 1 by means of an upwardly extending tongue 64 which enters a slot formed by a strap 65 carried by the base and is removably secured therein by a set screw 66. In order to avoid direct loss of heat through the bracket 61 when the cover is closed, the bracket may if desired be so formed that normally the foot 62 is raised above the support S. The bracket, however, is so inherently flexible that the weight of the cover 2 will depress the foot 62 into contact with the support S (see Fig. 2). The slots (Fig. 3) in the leaves of the hinges 59 and 60 attached to the base are preferably elongate so that the pivot pins can travel vertically therein as will appear from a comparison of the showing in Fig. 2 with that in Figs. 3 and 4.

The cover is adapted to be opened and closed by a handle 67 (Fig. 2) which includes a shaft 68 pivotally mounted in a bracket 70 carried by the shell 24. Fixed to the shaft at right angles thereto is a tongue 71. Should it be desired to support the cover 2 in a partly opened position, the tongue 71 after the cover has been raised sufficiently, may be swung inwardly by rotating the shaft 68 so that the tip of the tongue will rest upon the rim 10 when the cover is lowered.

Figure 1A:
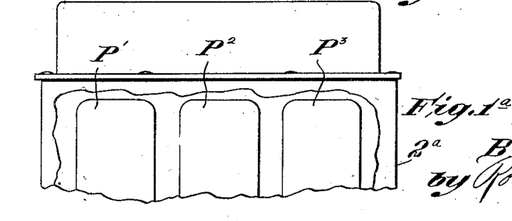
Fig. 1a is a small scale diagrammatic view partly broken away, showing apparatus of different shape.

In Fig. 1a a cooker of different external shape is illustrated, it being understood that this cooker will be constructed in all substantial respects like that above described, except that in this instance the top of the cooker is substantially flat, as indicated at F, thus affording a support for cooking utensils or the like which may be set thereon and which will be warmed or kept warm by heat escaping from the interior of the cooker.

It is obvious, as indicated in Fig. 1a, that a plurality of cooking pots P1, P2, P3, etc., each like the pot P hereinafter described, may be placed at the same time within the interior chamber of the cooker, thus providing for the simultaneous cooking of different substances.

Figure 3:
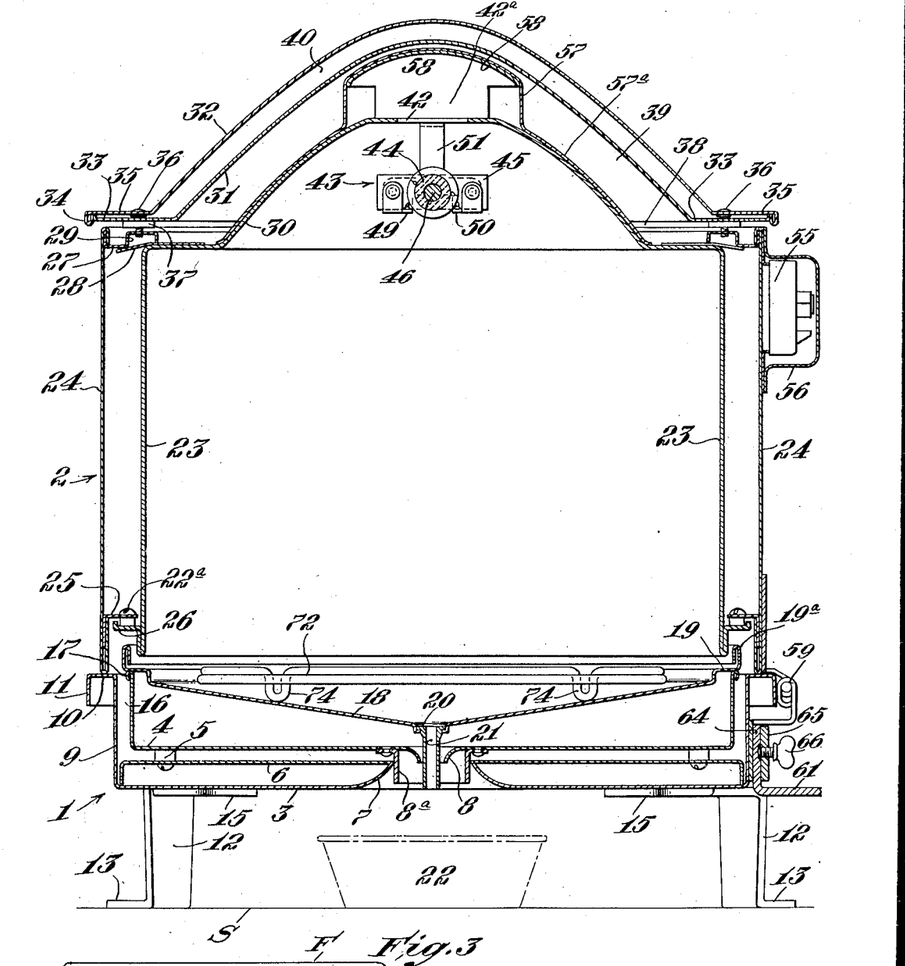
Fig. 3 is a sectional view of the apparatus when arranged for broiling or grilling food.

When the cooker is used for broiling, grilling, or similarly processing food, a pan 18 and rack 72 are employed, as shown in Fig. 3. The pan 18 has an outwardly directed marginal portion 19 which may rest directly upon the beaded edge 17 of the inner shell 4 of the base, but if deemed necessary it may be so supported as to avoid any loss of heat by conduction to the wall 16 of the shell 4. As shown, the outer edge of the part 19 is turned up to form a flange 19a. The upper face of the pan is downwardly concave and adapted to catch grease and at its center, which is the lowest area of the pan, the pan has an opening 20 and a grease delivering pipe 21. The pipe is suitably secured to the pan and extends downwardly through the boss 8 and ring 8a so that the grease is delivered out of the cooker into a receptacle 22. A rack 72 of any desired type, and having legs 74, rests upon the pan 18 and supports the food.

When the cooker is used for steaming, baking, boiling, roasting or otherwise cooking food, the pan 18 and rack 72 are replaced by a covered pot P, here shown as comprising the pot proper, designated 75, which may rest directly upon the inner face of the shell 4 and which may close the opening through the boss 8 (see Fig. 4), and the cover 76. The pot cover comprises a domed inner shell 77 and a domed outer shell 78. The inner shell terminates at the bottom in an outwardly extending horizontal flange 79 and a downwardly directed rolled edge 80. The flange rests on the upper edge of the pot 75 and the downwardly directed edge or rim 80 is of such diameter as to fit quite snugly about the top of the pot. The outer shell 78 is spaced from the inner shell 77 and its bottom edge is clamped in the rolled edge 80 of the inner shell so that the shells are firmly connected in leak-proof relation.

In the top of the outer shell is an opening 81 (Fig. 4) which is defined by an upturned flange 82 fixed to or integral with the shell 78. A cap 83 fits down over this flange and normally closes the opening 81. A strap 84, under which a lifter or other suitable implement may be inserted to facilitate lifting the pot cover 76, may conveniently be attached to the flange 82. In the top of the inner shell 77 (Fig. 6) there are provided openings 85, each surrounded by an upstanding flange 86, here shown as integral with the inner member 77 of the pot cover. These flanges are of such height that the upper edges thereof assist in supporting the upper central portion of the shell 78. However, these flanges are notched or otherwise shaped to provide openings 87 giving communication between the space 88 between the inner and outer walls of the pot cover and the space within the flange 86 and which communicate with the interior of the pot.

Figures 4, 6:
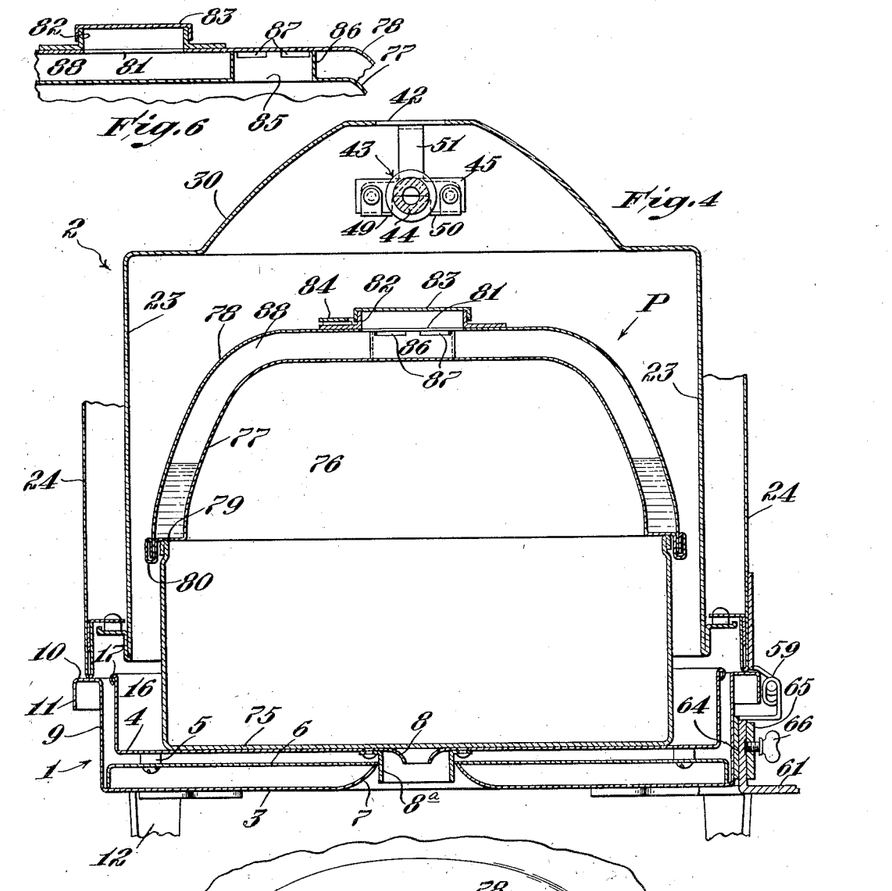
Fig. 4 is an incomplete sectional view of the apparatus when arranged for steaming or boiling.
Fig. 6 is a fragmentary section on the line 6—6 of Fig. 5.
Figure 5:
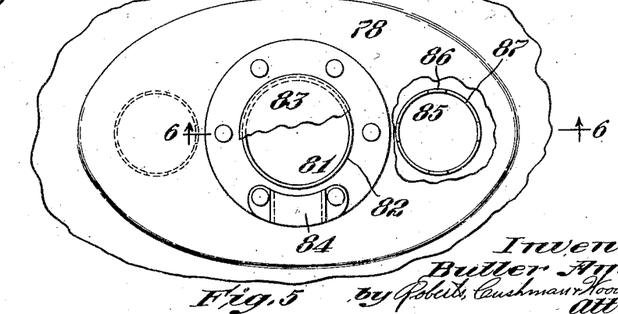
Fig. 5 is a fragmentary plan view of the top of the pot cover shown in Fig. 4, with certain parts broken away.

The food to be cooked is placed in the pot 75, and is preferably supported above the bottom of the pot by means of a suitable rack or the like if it is to be steamed or boiled, although it may, if desired, be placed directly upon the bottom of the pot or in another receptacle resting upon the pot bottom. The space 88 between the walls of the pot cover is then partially filled with water through the opening 81. The cooker is now closed and heat is supplied. The heat energy from the heat source 43 impinges upon the outer surface of the outer member 78 of the pot cover, and this heat is conducted down to the water in the space 88 and gradually heats this water until vapor is evolved from its upper surface. The vapor given off from the liquid rises and enters through the openings 87 and thence passes downwardly into the interior of the cooking pot. As the vapor rises between the walls 77 and 78 it becomes highly heated and in fact enters the pot in the form of superheated steam and this steam rapidly heats the contents of the pot. By the time the water has all boiled out from the space between the walls 77 and 78, sufficient heat is being transmitted by conduction downwardly along the sides of the pot to heat the bottom of the pot and the interior walls of the cooking chamber, so that thereafter the contents of the pot are maintained at the cooking temperature.

The cooker depends for its operation upon the radiant energy emitted from the heating element 43. The top 30 of the cover which supports the element 43 is, as here shown, arcuate and preferably parabolically curved so that all rays from the element 43 falling upon the walls are reflected uniformly and directly upon the food when roasting, grilling or the like is going on, or upon the cover of the pot P when that is used. The element 43 is preferably heated to approximately a cherry red heat, for it is found that at this heat the energy waves emitted therefrom penetrate the food more effectively than if the temperature of the heat source were raised to a whiter heat.

The walls of the cooker upon which these rays fall are of aluminum or coated with aluminum, or of such other material or so finished as to have a relatively low heat and light-absorptive capacity, whether the rays be of long or short wave length. For instance, stainless steel or the like coated with a vitreous enamel may be useful under certain conditions. The radiant energy is thereby directed substantially without loss upon the food. The valve 57 normally almost completely closes the exit from the chamber within the cooker so that the steam and cooking vapors created therein are held until the differential pressure at the inner and outer sides of the valve causes the latter to open. This introduces a time element with respect to the escape of vapors and gases from the cooking chamber, allowing proper ventilation and even the introduction of fresh air at times. On the other hand, as above described, the valve device is so devised that any vapors escaping from the cooking chamber must pass in such intimate relation to highly heated surfaces as to insure elimination of all objectionable odors. Apparently the highly heated opposed surfaces of the closely adjacent parts 30 and 51ª have a certain catalytic effect which contributes to this breakdown of the complex odoriferous substances which are evolved in cooking.

When used for cooking foods by steaming, boiling, roasting or the like, the radiant energy emitted from the heating element 43 falls directly upon the outer walls of the pot P and raises the temperature thereof. The heat thus created in the outer shell 78 of the pot cover, performs two functions, to wit it is transmitted by conduction to the lower portion or pot proper to assist in raising the temperature of the contents thereof, and it is transmitted as above described to the water in the space between the inner and outer shells of the cover so as gradually to vaporize this water.

As already suggested the vapor rising from the steaming water in the cover is heated as it rises toward the passage 87 and enters the pot above the boiling point. This hot vapor heats the contents of the pot and also maintains a relatively moderate temperature in the upper part of the pot, and while raising the material in the pot to a cooking temperature, protects it from burning, scorching or undue browning. During such cooking the vapor evolved from the cooking material may escape slowly through the joint at the junction of the pot proper and the cover, thus maintaining sufficient pressure within the pot to make it possible to cook at a temperature of 212° or more, it being noted that the pot cover fits quite snugly about the upper edge of the lower part 75.

When roasting in the pot, the food to be roasted is preferably placed upon a rack supporting it slightly above the bottom of the pot. As the roasting operation approaches completion and the bottom of the pot becomes highly heated, the liquids in the bottom of the pot are projected by what may be termed explosive action forcibly against the under surface of the food, thus properly basting the latter. Just before the completion of the roasting operation the pot may be opened and the food turned over so that the surface which was previously at the top will be exposed to this basting operation.

After the cooking has been completed the supply of current to the heating element 43 is cut off, the cover 2 is raised, or the door, if one be provided, is opened and the food is removed. The cooker, together with the utensils used, e. g. the pan 18 and rack 72, or the pan 75 and cover 76 can, if necessary, be cleaned by closing the cover 2 or door and again energizing the heating element 43. The radiant energy emitted from the element acts upon the surfaces of the utensils and the walls of the cooker to raise the temperature thereof and any food or grease thereon is attacked and converted by the rays of energy into vapors. The heat within the cooker consumes such food or grease and breaks up the vapors therefrom so that no odors will be emitted from the cooker.

As pointed out above, the amount of current supplied to the heating element 43 and the amount of radiant energy emitted therefrom may be varied in accordance with the conditions required. The refractory core 44 is so designed that it becomes heated to that temperature at which it emits radiant rays of the wave lengths best fitted for cooking and cleansing and for the burning and destruction of objectionable odors and smoke. The metal terminals and supporting bases are preferably of nickel or other metal coated with a low light-absorptive substance, because it does not tarnish or oxidize in the intense heat and does not absorb to an undue extent the rays of radiant energy falling thereon. A rod 46 of Monel metal, nickel or other metal having slow oxidizing but high absorptive qualities may be inserted within the core 45 should it be desired.

Figure 10:
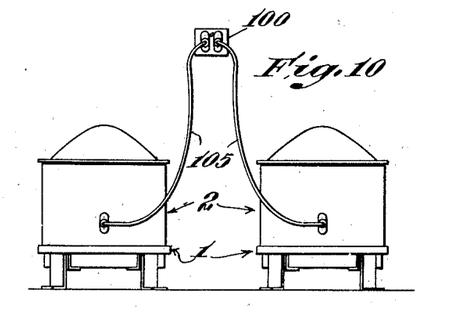
Fig. 10 is a diagrammatic view of a battery of two cookers having common control means for the heating elements thereof.

As previously pointed out, the current required may be of three different amounts, to wit, that for the coil 47 alone, that for the coil 48 alone, and that for both coils simultaneously. The amounts required for either coil alone are relatively small and if desired two cookers may be supplied at the same time from the same line with either of these amounts of current. The amount of current required for both coils simultaneously, however, is so large that to supply two cookers with such an amount at the same time would place an undue load upon the line (Fig. 10).

Figures 11, 12:
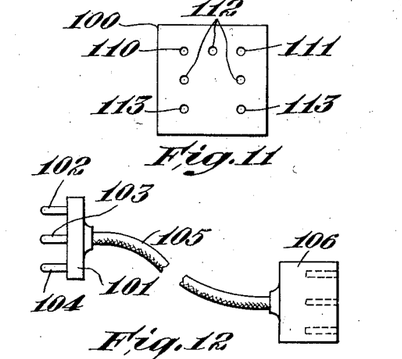
Figs. 11 and 12 illustrate one type of such control means.

One means of attaining this result is shown in Figs. 11 and 12 as comprising an outlet box 100 and two plugs 101 each provided with prongs 102, 103 and 104 and connected by a lead 105 and plug 106 to one of the cookers. The outlet box 100 is provided with a plurality of prongreceiving cavities connected in any suitable manner with a three wire house line (not shown) through which the usual 110 volt current flows. The cavity 110 is connected to one feed wire, the cavity 111 to the other feed wire line, the cavities 112 to the common return wire, and the cavities 113 are electrically dead and serve merely to accommodate and receive a prong under certain conditions.

It will be understood that the prongs of each plug 101 are connected with the prongs of a cooker by the plug 106. For convenience it is assumed that these conditions are as follows: prong 102 with prong 53ª, prong 103 with prong 53ᵇ, and prong 104 with prong 53ᶜ. Hence when the prongs of the plug 101 of a cooker enter a vertical row of cavities either 110, 112 and 113, or 111, 112 and 113, one of the coils of that cooker is energized. The coil 47 is energized if the prong 102 is in the cavity 111 and the coil 48 is energized if the prong 104 is in that cavity. As a guide or manual indicator, the opposite sides of the plug may be colored or provided with indicia or may be differently formed. When the prongs of a plug enter the horizontal row of cavities 110, 112 and 111 both coils 47 and 48 of the cooker are energized. Attention is called to the fact that while both cookers may be simultaneously at low or medium heat, the connection of either cooker for high heat prevents any connection of the other cooker and thereby overloading of the line is prevented.

Figure 13:
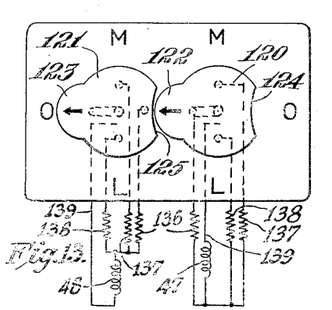
Fig. 13 is a diagrammatic view illustrating another form of control means.

In Fig. 13 there is diagrammatically illustrated a switch device which may be used in substitution for the plugs above described. This switch device comprises two rotatable knobs 120 and 121 respectively, each of generally circular contour and having their axes so spaced apart that their curved peripheries are closely adjacent. Each knob has at one point a projecting lug 122, 123 respectively, and at a diametrically opposite point an arcuate recess 124, 125, respectively. The switch contacts (not shown) may be of any of the usual types such as are employed for supplying current at different rates to the heating elements of electric ranges or the like. However, the connections are such that when the lugs of the two knobs are oppositely directed no current is supplied to either coil. Each knob may be turned independently of the other through an arc of 90° either right or left, thereby to supply current for low or medium heat respectively. On the other hand only one knob at a time can be turned from the neutral position through 180° so as to direct its lug inwardly and thereby to furnish its respective coil with current for the highest degree of heat, since it is only when one knob is in the off or neutral position that the lug of the other knob can enter the recess of the first knob and thus occupy the high heat position.

Figure 14:
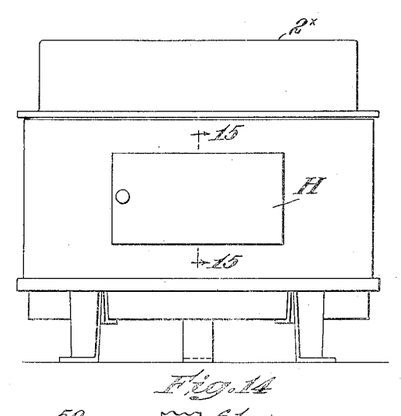
Fig. 14 is a small scale diagrammatic front view of another embodiment of the invention.
Figure 15:
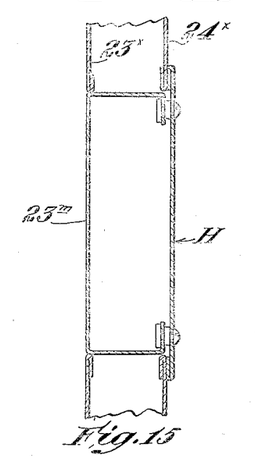
Fig. 15 is a fragmentary section, to larger scale, on the line 15—15 of Fig. 14.
Figure 16:
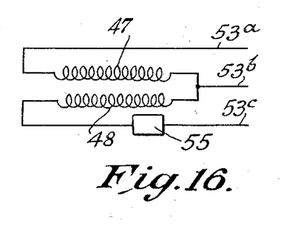
Fig. 16 is a diagram of the electric circuits controlling the heating element.

While as here shown the entire top of the cooker is arranged to be opened so as to give access to its interior, the cooker may be constructed, as diagrammatically indicated in Figs. 14 and 15, to have a top 2ˣ which is normally stationary and to have a hinge door H in its side wall similar to an oven door. This door H is so constructed and arranged as, when closed, to close openings in both the inner and outer shells 23ˣ and 24ˣ, it being understood that the inner surface 23ᵐ of the door H will be of a non-light-absorbent material or have a non-light-absorbent surface finish generally similar to that of the inner shell 23ˣ itself.

While one embodiment of this invention has been shown and described it will be understood that the invention is not limited thereto and that other embodiments may be made without departing from the spirit and scope thereof as set forth in the following claims.

I claim:

1. A cooker of the class described having a base and a cover therefor, said base and cover defining a cooking chamber, said cover comprising a side wall and a top, the cover having an exit opening, said top including an inner shell having an aperture therein, and a second shell spaced from the inner shell to provide a passage leading from said aperture to the exit opening, means for heating said chamber, and a valve carried by and cooperating with said inner shell, said valve normally resting upon the inner shell and substantially closing said passage but being arranged to open in response to differential pressure within and without the chamber, thereby to permit the escape of vapor from said chamber through the aperture and passage to the exit opening.

2. A cooker of the class described having a base and a cover therein, the base and cover defining a cooking chamber, the cover comprising a side wall and a top, means providing an exit opening in the cover, said top including an inner shell having an aperture therein, a second shell spaced from the inner shell thereby to provide a passage leading from the aperture to the exit opening, a heating element suspended in the cooking chamber and below the aperture in the inner shell, and a light, easily movable valve element normally substantially closing said passage and thereby restricting the flow of gaseous substances therethrough, the valve normally resting upon a heated portion of said inner shell so as to become highly heated and being constructed and arranged to rise in response to differential pressure within and without the chamber, thereby to afford a narrow passage along the hot wall of the inner shell for the escape of vapor from said chamber, whereby any complex odor-forming substances in the vapor are broken down.

3. A cooker of the class described having a base and a cover therefor, the base and cover defining a cooking chamber, the cover having an exit opening, a heating element within the chamber, the surface of said cover defining the cooking chamber being highly heated by said element and a valve within the cover, the valve being so designed and arranged as to delay the escape of gaseous substances from the chamber through the exit opening and to keep such gaseous substances in close and intimate contact with such highly heated surface during their passage from the chamber to the exit opening, whereby any complex odor-forming substances in the vapor are broken down.

4. A cooker of the class described comprising outer walls, inner walls spaced from the outer walls and in poor heat-conducting relation to the latter, the inner walls defining a cooking chamber, the inner surfaces of the inner walls being of low heat-absorptive capacity, a source of radiant energy within the chamber, means providing for the escape of liquid from the lower part of the chamber, means providing for the escape of gaseous substances from the upper part of the chamber, and automatic valve means coacting with the outer surfaces of the inner walls normally preventing the escape of such gaseous substances.

5. A cooker of the class described comprising outer walls, inner walls spaced from the outer walls and in poor heat-conducting relation to the latter, the inner walls defining a cooking chamber, the inner surfaces of the inner walls being of low heat-absorptive capacity, a source of radiant energy within the chamber, and means providing a passage of variable capacity for the escape of gaseous substances from the upper part of the chamber, said passage having highly heated walls operative to break down complex odoriferous substances in escaping through said passage thereby to eliminate objectionable odors evolved in cooking.

6. A cooker of the class described having a base and a cover therefor, said base and cover defining a cooking chamber, a heating element within the chamber, said cover comprising an inner and an outer wall spaced apart, means providing an exit opening in the outer wall leading from the space between such walls, an aperture in the inner wall through which gases may flow from the cooking chamber into the space between the inner and outer walls, and valve means carried by the inner wall and normally resting thereagainst to prevent the escape of such gases through the exit opening.

7. A cooker of the class described having a base and a cover therefor, said base and cover defining a cooking chamber, a heating element within the chamber, said cover comprising an inner and an outer wall spaced apart, means providing an exit opening in the outer wall leading from the space between such walls, an aperture in the inner wall through which gases may flow from the cooking chamber into the space between the inner and outer walls, a support on the outer surface of the inner wall above said aperture, and valve means resting upon said support and upon the outer surface of the inner wall to prevent the escape of such gases through the exit opening until raised out of contact with the inner wall by the pressure differential created by the evolution of such gases in the chamber.

8. A cooker of the class described having a base and a cover therefor, said base and cover defining a cooking chamber, a heating element within the chamber, said cover comprising an inner and an outer wall spaced apart, means providing an exit opening in the outer wall leading from the space between such walls, an aperture in the inner wall through which gases may flow from the cooking chamber into the space between the inner and outer walls, a support on the outer surface of the inner wall above said aperture, and valve means for controlling the escape of such gases through the exit opening, said valve means resting at its center upon said support and having a flexible skirt-like portion which normally rests upon the outer surface of the inner wall and is heated by its contact therewith, said portion being raised out of contact with the inner wall by the pressure differential created by the evolution of such gases in the chamber, the heated inner wall and valve skirt acting to break down any complex odor-forming substances in the gases.

BUTLER AMES.